(12) United States Patent
Keresman, III et al.

(10) Patent No.: US 9,317,850 B2
(45) Date of Patent: Apr. 19, 2016

(54) METHOD AND SYSTEM FOR PROCESSING PIN DEBIT TRANSACTIONS

(75) Inventors: Michael A. Keresman, III, Kirtland Hills, OH (US); Paul Turgeon, Chicago, IL (US)

(73) Assignee: CardinalCommerce Corporation, Mentor, OH (US)

( * ) Notice: Subject to any disclaimer, the term of this patent is extended or adjusted under 35 U.S.C. 154(b) by 186 days.

(21) Appl. No.: 13/080,119

(22) Filed: Apr. 5, 2011

(65) Prior Publication Data

US 2011/0246324 A1    Oct. 6, 2011

Related U.S. Application Data

(60) Provisional application No. 61/320,868, filed on Apr. 5, 2010.

(51) Int. Cl.
| | | |
|---|---|---|
| *G06Q 20/00* | (2012.01) |
| *G06Q 20/38* | (2012.01) |
| *G06Q 20/08* | (2012.01) |
| *G06Q 20/12* | (2012.01) |
| *G06Q 30/06* | (2012.01) |
| *G06Q 20/02* | (2012.01) |
| *G06Q 20/24* | (2012.01) |
| *G06Q 20/26* | (2012.01) |

(52) U.S. Cl.
CPC .............. *G06Q 20/385* (2013.01); *G06Q 20/02* (2013.01); *G06Q 20/0855* (2013.01); *G06Q 20/12* (2013.01); *G06Q 20/24* (2013.01); *G06Q 20/26* (2013.01); *G06Q 20/383* (2013.01); *G06Q 30/0613* (2013.01)

(58) Field of Classification Search
CPC ........................... G06Q 20/385; G06Q 30/383
USPC ......................................... 705/39, 44, 64, 67
See application file for complete search history.

(56) References Cited

U.S. PATENT DOCUMENTS

| | | | |
|---|---|---|---|
| 6,254,000 B1 * | 7/2001 | Degen et al. ................... 235/380 |
| 6,327,578 B1 * | 12/2001 | Linehan .......................... 705/65 |
| 6,901,387 B2 | 5/2005 | Wells et al. |
| 6,908,030 B2 | 6/2005 | Rajasekaran et al. |

(Continued)

FOREIGN PATENT DOCUMENTS

| | | |
|---|---|---|
| JP | 2001-256407 | 9/2001 |
| JP | 2004-054897 | 2/2004 |

(Continued)

OTHER PUBLICATIONS

Ron White, "How Computers Work", Oct. 15, 2003, Que.*
PCT International Search Report dated May 27, 2011.

*Primary Examiner* — Steven Kim
(74) *Attorney, Agent, or Firm* — Fay Sharpe LLP

(57) ABSTRACT

A system for processing a debit transaction between a merchant and a consumer. The system includes one or more processors programmed to receive payment information for the consumer, collect authentication data for the debit card from the consumer, transmit an alias account number unique to the debit transaction to the merchant, receive a credit authorization message including the alias account number from the merchant, translate the credit authorization message to a debit authorization message using the authentication data, and transmit the debit authorization message to a payment processor.

18 Claims, 3 Drawing Sheets

(56) References Cited

U.S. PATENT DOCUMENTS

| | | | |
|---|---|---|---|
| 6,980,970 B2* | 12/2005 | Krueger | G06Q 20/02 705/38 |
| 7,039,603 B2* | 5/2006 | Walker | G06Q 20/00 705/14.13 |
| 7,051,002 B2 | 5/2006 | Keresman, III et al. | |
| 7,069,249 B2* | 6/2006 | Stolfo et al. | 705/74 |
| 7,225,156 B2* | 5/2007 | Fisher | G06Q 20/02 235/379 |
| 7,356,507 B2 | 4/2008 | Bezos et al. | |
| 7,379,916 B1 | 5/2008 | Mizrah | |
| 7,398,253 B1 | 7/2008 | Pinnell | |
| 7,413,112 B2 | 8/2008 | Nelson | |
| 7,434,723 B1 | 10/2008 | White et al. | |
| 7,472,829 B2 | 1/2009 | Brown | |
| 7,494,067 B1 | 2/2009 | Zhu | |
| 7,536,351 B2 | 5/2009 | Leblang et al. | |
| 7,542,943 B2 | 6/2009 | Caplan et al. | |
| 7,543,739 B2 | 6/2009 | Brown et al. | |
| 7,567,934 B2 | 7/2009 | Flitcroft et al. | |
| 7,577,585 B2 | 8/2009 | Horrocks et al. | |
| 7,580,898 B2 | 8/2009 | Brown et al. | |
| 7,584,151 B2 | 9/2009 | Wells et al. | |
| 7,606,766 B2 | 10/2009 | Anderson et al. | |
| 7,606,770 B2 | 10/2009 | Pinnell | |
| 7,693,783 B2 | 4/2010 | Balasubramanian et al. | |
| 7,770,789 B2* | 8/2010 | Oder, II | G06Q 20/20 235/380 |
| 7,841,523 B2* | 11/2010 | Oder, II | G06Q 20/20 235/380 |
| 7,891,563 B2* | 2/2011 | Oder, II | G06Q 20/20 235/380 |
| 2002/0111907 A1* | 8/2002 | Ling | 705/41 |
| 2003/0126094 A1 | 7/2003 | Fisher et al. | |
| 2003/0182558 A1* | 9/2003 | Lazzaro | G06Q 30/0641 713/183 |
| 2003/0226042 A1 | 12/2003 | Fukushima | |
| 2004/0044739 A1* | 3/2004 | Ziegler | G06Q 20/02 709/213 |
| 2004/0139008 A1* | 7/2004 | Mascavage, III | 705/40 |
| 2005/0027648 A1* | 2/2005 | Knowles et al. | 705/38 |
| 2005/0246290 A1* | 11/2005 | Kausik | 705/67 |
| 2006/0123465 A1 | 6/2006 | Ziegler | 726/2 |
| 2006/0242085 A1* | 10/2006 | Jones et al. | 705/64 |
| 2007/0192245 A1* | 8/2007 | Fisher et al. | 705/39 |
| 2007/0271179 A1* | 11/2007 | Kubota | 705/39 |
| 2008/0040274 A1* | 2/2008 | Uzo | 705/44 |
| 2008/0097925 A1* | 4/2008 | King | 705/67 |
| 2008/0275748 A1 | 11/2008 | John | |
| 2009/0037982 A1 | 2/2009 | Wentker et al. | |
| 2009/0083159 A1* | 3/2009 | Maw | 705/17 |
| 2009/0157518 A1 | 6/2009 | Bishop et al. | |
| 2009/0271262 A1* | 10/2009 | Hammad | G06Q 20/04 705/14.33 |
| 2009/0313147 A1 | 12/2009 | Balasubramanian et al. | |
| 2010/0057554 A1* | 3/2010 | Lanford | 705/14.38 |
| 2010/0088206 A1* | 4/2010 | Lister | 705/34 |
| 2010/0153272 A1* | 6/2010 | Wentker | G06F 21/33 705/44 |
| 2011/0180598 A1* | 7/2011 | Morgan et al. | 235/380 |

FOREIGN PATENT DOCUMENTS

| | | |
|---|---|---|
| JP | 2007-286697 | 11/2007 |
| JP | 2008-158638 | 7/2008 |
| JP | 2008-305392 | 12/2008 |
| WO | WO 2008/131021 | 10/2008 |

* cited by examiner

METHOD AND SYSTEM FOR PROCESSING PIN DEBIT TRANSACTIONS

This application claims the benefit of U.S. Provisional Application No. 61/320,868, filed Apr. 5, 2010, incorporated herein by reference in its entirety.

BACKGROUND

The present exemplary embodiment relates to electronic commerce (or e-commerce). It finds particular application in conjunction with personal identification number (PIN) debit cards, and will be described with particular reference thereto. However, it is to be appreciated that the present exemplary embodiment is also amenable to other like applications.

By way of background, Internet commerce, or e-commerce as it is otherwise known, relates to the buying and selling of products and/or services between consumers and merchants over the Internet or other like transactional exchanges of information. The convenience of shopping over the Internet has sparked considerable interest in e-commerce on behalf of both consumers and merchants. In the United States, the fastest growing card type is the PIN debit card. However, today there is no ubiquitous way to use a PIN debit card on the Internet.

The present invention contemplates new and improved systems and/or methods which overcome the above-referenced problems and others.

INCORPORATION BY REFERENCE

The following commonly assigned applications, the disclosures of each being completely incorporated herein by reference, are mentioned:
U.S. Pat. No. 7,051,002 entitled "Universal Merchant Platform for Payment Authentication," by Keresman, III et al.; and,
U.S. Pat. No. 7,693,783 entitled "Universal Merchant Platform for Payment Authentication," by Balasubramanian et al.

BRIEF DESCRIPTION

Various details of the present disclosure are hereinafter summarized to provide a basic understanding. This summary is not an extensive overview of the disclosure and is intended neither to identify certain elements of the disclosure, nor to delineate the scope thereof. Rather, the primary purpose of the summary is to present certain concepts of the disclosure in a simplified form prior to the more detailed description that is presented hereinafter.

In accordance with one aspect, a system for processing a debit transaction between a merchant and a consumer is provided. The system includes one or more processors programmed to receive payment information for the consumer, collect authentication data for the debit card from the consumer, transmit an alias account number unique to the debit transaction to the merchant, receive a credit authorization message including the alias account number from the merchant, translate the credit authorization message to a debit authorization message using the authentication data, and transmit the debit authorization message to a payment processor. Payment information for the consumer is received from the merchant.

In accordance with another aspect, a method for processing a debit transaction between a merchant and a consumer is provided. Payment information for the consumer is received. The payment information identifying a debit card. Authentication data for the debit card is collected from the consumer. An alias account number unique to the debit transaction is transmitted to the merchant and a credit authorization message including the alias account number is received from the merchant. The credit authorization message is translated to a debit authorization message using the authentication data and the debit authorization is transmitted to a payment processor.

One advantage resides in the ability to use a PIN debit card to complete an Internet purchase.

Another advantage resides the ability to reduce risk of identity theft or fraud.

Another advantage resides in the ability to minimize changes required of organizations that process merchant payment transactions.

Still further advantages of the present invention will be appreciated to those of ordinary skill in the art upon reading and understanding the following detailed description.

BRIEF DESCRIPTION OF THE DRAWINGS

The presently disclosed subject matter may take form in various components and arrangements of components, and in various steps and arrangements of steps. The drawings are only for purposes of illustrating preferred embodiments and are not to be construed as limiting. Further, it is to be appreciated that the drawings are not to scale.

DETAILED DESCRIPTION

Figure 1:
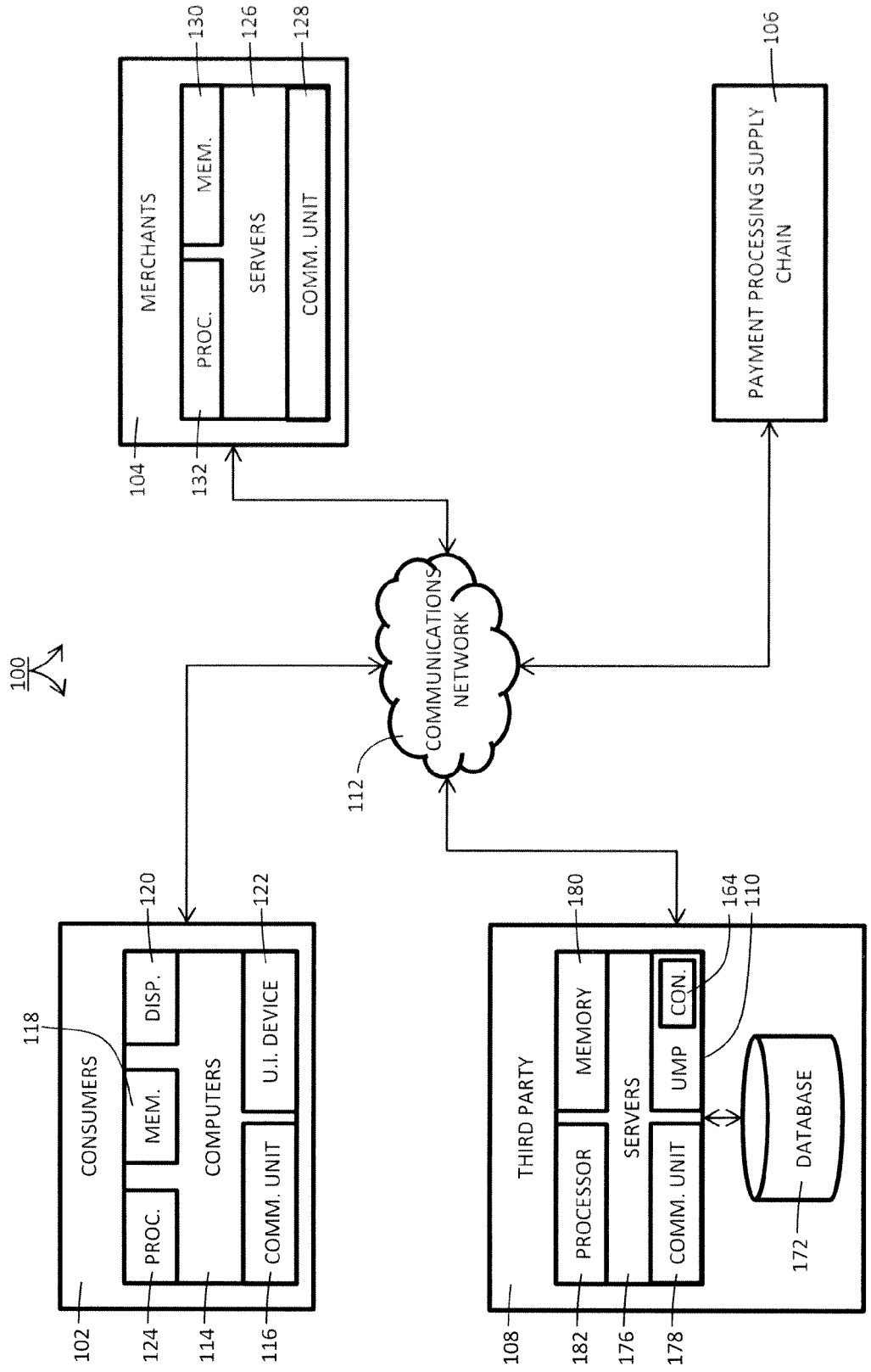
FIG. 1 is a block diagram of a system for processing debit transactions according to aspects of the present disclosure.

With reference to FIG. 1, a block diagram of a system 100 for processing debit transactions, such as PIN debit transactions, is shown. The system 100 suitably includes one or more consumers 102, one or more merchants 104, at least one payment processing supply chain 106, a third party 108 providing a universal merchant platform (UMP) 110, and the like, interconnected by a communications network 112. The communications network 112 is typically the Internet, but other communications networks are contemplated. For example, the communications network 112 may include one or more of a local area network, a wireless network, and the like.

The consumers 102 may electronically purchase products and/or services from the merchants 104 over the communications network 110 via graphical user interfaces, such as e-commerce websites, of the merchants 104. In that case, the consumers 102 may employ web browsers to access the graphical user interfaces and purchase the products and/or services. However, it is to be appreciated that other means of electronically purchasing the products and/or services are contemplated. For example, stand-alone programs embodying the graphical user interfaces can be distributed, optionally via the communications network 110, to the consumers 102. To purchase the products and/or services over the communications network 112, the consumers 102 submit a payment type to the merchants 104. A payment type includes, for example, PIN debit card, credit card, and so on.

Each of the consumers 102 is suitably embodied by a digital processing device 114, such as a computer, smart phone, PDA, and the like, connected to the communications network 112. Further, each of the digital processing devices 114 suitably includes a communications unit 116, at least one memory 118, a display 120, a user input device 122, a processor 124, and the like. The communications units 116 allow the digital processing devices 114 to interact with other components connected to the communications network 112. The memories 118 include computer executable instructions for performing the above-noted functions associated with the consumers 102. The displays 120 display the graphical user interfaces (e.g., via web browsers) facilitating consumer interaction with the digital processing devices 114. The user input devices 122 allow the consumers 102 to interact with the graphical user interfaces. The processors 124 execute the computer executable instructions on the memories 118.

The merchants 104 provide the consumers 102 the graphical user interfaces, typically via the communications network 112. For example, it is contemplated that the graphical user interfaces are e-commerce websites. The graphical user interfaces suitably allow the consumers 102 to purchase products and/or services electronically over the communications network 112 through submission of payment types. For example, the graphical user interfaces allow consumers 102 to select and submit products and/or services to purchase and select and submit a payment type for payment therefor to the merchants 104.

When a merchant receives the payment type from a consumer, the merchant submits the payment type to the UMP 110 and places the consumer in communication with the UMP 110 via, for example, an iFrame, a redirect to the UMP 110, and so on. The UMP 110 collects payment information, such as a card number and expiration date, for the payment type from the consumer and partially or wholly completes the transaction using the payment type. For example, the UMP 110 collects payment information for the payment type and processes transactions involving PIN debit cards. As another example, the UMP 110 for collects payment information for the payment type and processes transactions involving authenticated payment initiatives. Although the UMP 110 can be employed to wholly complete a transaction, it is typically employed to partially complete a transaction. In that regard, the merchant suitably performs the authorization and capture of funds typical of credit card transactions and offloads, for example, authentication or payment selection to the UMP 110.

To use the UMP 110, the merchants 104 suitably register with the third party 108 providing the UMP 110. This step may include the merchants 104 providing merchant information (e.g., financial information, physical address, category of goods or services sold, Internet address, email address, etc.) to the third party 108. Typically, the merchant information is provided over the communications network 112 via a graphical user interface, such as a web interface, offered by the third party 108. However, other means of providing the merchant information, such as via a telephone, are contemplated. Additionally, the merchant information is suitably modifiable, optionally via the graphical user interface and/or the communications network 112. In certain embodiments, registration may further include signing and/or executing an agreement of the third party 108.

Further, to use the UMP 110, the merchants 104 suitably augment their graphical user interface and/or backend systems supporting the graphical user interfaces to employ the UMP 110. For example, a merchant may add a hosted iFrame linking their graphical user interface to the third party 108. Advantageously, this allows easy integration with the UMP 110, especially during the submission of payment information. As another example, a merchant may modify their back-end system to forward all debit PIN transactions to the UMP 110 for processing.

One or more servers 126 connected to the communications network 112 suitably embody each of the merchants 104. Each of the servers 126 includes one or more of a communications unit 128, at least one memory 130, a processor 132, and the like. The communications units 128 allow the servers 126 to interact with other components connected to the communications network 112. The memory 130 generally includes computer executable instructions for performing the above-noted functions associated with the merchants 104. The processors 132 execute the computer executable instructions on the memory 130.

Figure 2:
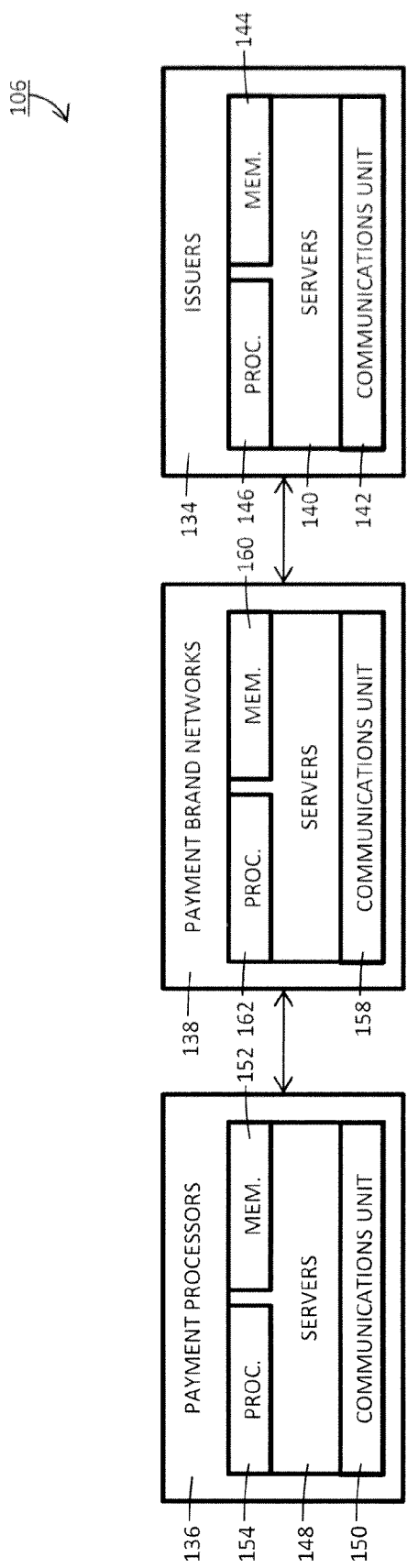
FIG. 2 is a block diagram of a payment processing supply chain.

The payment processing supply chain 106 facilitates the transfer of funds from the consumers 102 to the merchants 104. As shown in FIG. 2, the payment processing supply chain 106 suitably includes one or more issuers 134, one or more payment processors 136, and one or more payment brand networks 138. In certain embodiments, the payment processing supply chain 106 further includes one or more payment gateways (not shown) providing the merchants 104 with an interface to the payment processors 136.

The issuers 134 issue payment instruments, such as prepaid/stored value cards, debit cards and/or credit cards, to the consumers 102. In that regard, the issuers 134 have an account relationship with the consumers 102, and one of the issuers 134 suitably issues each payment instrument processed by the system 100. One or more servers 140 suitably embody each of the issuers 134. Each of the servers 140 includes one or more of a communications unit 142, at least one memory 144, a processor 146, and the like. The communications units 142 allow the servers 140 to interact with the payment brand networks 138, optionally via a communications network, such as the communications network 112. The memory 144 generally includes computer executable instructions for performing the above-noted functions associated with the issuers 134. The processors 146 execute the computer executable instructions on the memory 144.

The payment processors 136 process purchase and payment transactions. The payment processors 136 include at least one payment processor implementing an Internet acquiring platform and, optionally, at least one payment processor implementing a debit acquiring platform. Insofar as the payment processors 136 do not include a payment processor implementing a debit acquiring platform, the third party 108 carries out this role. Although not necessary, a payment processor can implement both an Internet acquiring platform and a debit acquiring platform. Each of the merchants 104 typically employs one or more of the payment processors 136 (e.g., as their financial institution and/or acquiring bank), where the payment processors for each of the merchants implement an Internet acquiring platform and, optionally, a debit acquiring platform. A debit acquiring platform processes purchase and payment transactions initiated at physical world (card present) merchants and an Internet acquiring platform processes purchase and payment transactions initiated at e-commerce (card not present) merchants.

Typically, the messages used by debit acquiring platforms are different from the messages used by Internet acquiring platforms. Further, debit networks through which the messages are routed, discussed below, determine the messages used by debit acquiring platforms. Debit acquiring platforms typically process debit card transactions using a single message, hereafter referred to as a debit authorization message.

The debit authorization message is for the purpose of requesting authorization to make a purchase, and, for pay as you go transactions, if the request is approved, the authorization message also serves as the posting record. Internet acquiring platforms typically process credit card transactions using a dual message structure involving a credit authorization message and a credit settlement message. The credit authorization message places a hold on funds, and the credit settlement message captures funds from the affected account. Typically, the credit settlement messages are submitted in bulk (i.e., batch submission) after a predetermined time, such as the end of a business day. In certain embodiments, the messages employed by the payment processors 136 are in ISO 8583 format or another format proprietary to the entity processing the transaction.

One or more servers 148 suitably embody each of the payment processors 136. Each of the servers 148 includes one or more of a communications unit 150, at least one memory 152, a processor 154, and the like. The communications units 150 allow the servers 148 to interact with the payment brand networks 138, optionally via a communications network, such as the communications network 112. The memory 152 generally includes computer executable instructions for performing the above-noted functions associated with the payment processors 136. The processors 154 execute the computer executable instructions on the memory 152.

The payment brand networks 138 govern and process purchase and payment transactions. In this regard, the payment brand networks 138 generally employ network switches to process transactions and route them to the issuers 134. Suitably, the payment brand networks 138 include at least one debit network. Debit networks include debit network switches to process transactions and route them to the issuers 134 for approval and posting. An example of a debit network is a PIN debit network. A PIN debit network is a payment network that governs and processes purchase and payment transactions where the consumer is validated through the combination of presentment of a plastic card and entry of a PIN. Typical debit payment brand networks include STAR, NICE, and INTERLINK.

One or more servers 156 suitably embody each of the payment brand networks 138. Each of the servers 156 includes one or more of a communications unit 158, at least one memory 160, a processor 162, and the like. The communications units 158 allow the servers 156 to interact with payment processors 136 and the issuers 134, optionally via a communications network, such as the communications network 112. The memory 160 generally includes computer executable instructions for performing the above-noted functions associated with the payment brand networks 138. The processors 162 execute the computer executable instructions on the memory 160.

Referring back to FIG. 1, the third party 108 facilitates the completion of transactions between the consumers 102 and the merchants 104 by way of the UMP 110. The UMP 110 serves as a centralized merchant processing system to process electronic transactions through any payment brand network using a single platform. In this regard, it enables merchants to process payments, regardless of which payment brand network they are to be routed through, with a single implementation. For more information pertaining to the basic functionality of the UMP 110, attention is directed to, for example, U.S. Pat. No. 7,051,002 entitled "Universal Merchant Platform for Payment Authentication," by Keresman, III et al., and U.S. Pat. No. 7,693,783 entitled "Universal Merchant Platform for Payment Authentication," by Balasubramanian et al., both incorporated herein by reference in their entireties.

The UMP 110 can also be employed to process e-commerce transactions involving debit cards, such as PIN debit cards, with minimal modification to existing infrastructure.

To process transactions involving debit cards, the UMP 110 receives payment types from the merchants 104. For example, a consumer browses a merchant's e-commerce website and selects a product to purchase. Thereafter, the consumer chooses to pay for the product and is prompted to enter a payment type, such as a PIN debit card. This payment type is then submitted to the UMP 110 by way of the merchant. Upon receiving a payment type for a transaction between a consumer and a merchant, the UMP 110 collects payment information from the consumer based on the payment type selected by the consumer. Notably, identify theft is reduced since the merchant never has access to consumer payment information. The collected payment information is then used by a converter module 164 of the UMP 110 to complete the transaction.

Figure 3:
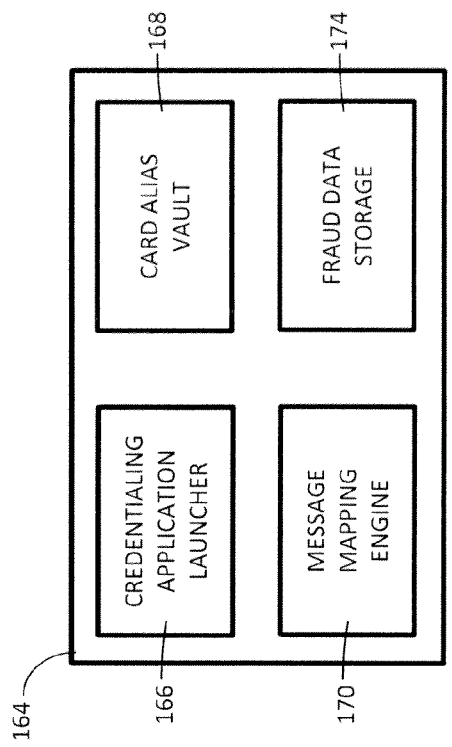
FIG. 3 is a block diagram of the functional components of a converter according to aspects of the present disclosure; and, FIG. 4 is a method for processing debit transactions according to aspects of the present disclosure.

The converter module 164 generally acts as a "black box" that accepts messages in a first format, such as credit card 0100 series messages, from the merchants 104 and translates them to a second format, such as debit card 0200 series messages, which payment processors can send to the various payment brand networks for routing to issuers. Further, the converter module 164 is authentication solution agnostic, and it will launch the appropriate authentication solution for each consumer based on the instructions of the issuer or payment brand network. For example, the converter module 164 can handle PIN based authentication or other types of authentication. Suitably, the converter module 164 performs the forgoing functions using a credentialing application launcher sub-module 166, a card alias vault sub-module 168, and a message mapping engine sub-module 170, shown in FIG. 3.

The credentialing application launcher sub-module 166 generally determines both routing information for the transaction (i.e., the payment brand network to employ) and a credentialing application for the transaction. A credentialing application is an application used to collect credentials, such as a PIN, from a consumer at the time each purchase or payment is initiated and is suitably approved by a payment brand network or issuer. Credentialing applications for Acculynk, HomeATM, MagTek, US Encode, Adaptive Payments, and Verient are contemplated. In certain embodiments, the determination is based on the provided payment information. For example, the determination may be made by using the card number of the payment information to perform a lookup in one or more bank identification number (BIN) tables, A BIN table contains the BINs eligible for routing to the payment brand networks 138 and indicates which credentialing application is to be used for each and which payment brand network each is to be routed to. Typically the BIN tables are stored in a database or memory, such as a database 172, and provided by the payment processors 136.

After determining the routing information and the credentialing application for the transaction, the credentialing application launcher sub-module 166 runs the credentialing application to acquire authentication data from the consumer. Authentication data is any data collected from the consumer deemed by the issuer of the payment instrument to be sufficient to authenticate the consumer. Suitably, authentication data is acquired through coordination between the merchant and the UMP 110, where the consumer is presented with a graphical user interface prompting them to submit the relevant authentication data, such as a debit card PIN. For example, the merchant redirects the consumer to an authentication page hosted by the UMP 110 over the communications network 112. As yet another example, the merchant includes an iFrame in their graphical user interface pointing to a page hosted by the UMP 110 over the communications network 112.

When the consumer submits the authentication data and the credentialing application receives the authentication data, the credentialing application processes the authentication data. Depending upon the determined credentialing application, processing causes consumer authentication to occur at this point or the credentials to be formatted for authentication by the issuer of the payment instrument during authorization processing, discussed below. As to the former, it is contemplated that the authentication data is submit to, for example, the issuer for verification over the communications network 112. The authentication data, optionally including authentication results, is then saved for subsequent use in a database or a memory, such as the database 172. As discussed hereinafter, this information will be appended to and/or substituted for data delivered in a credit authorization request message, such as a credit card 0100 message, that is received from an Internet acquiring platform of a payment processor, for inclusion in a debit authorization request message, such as a debit card 0200 message.

Subsequent to receiving the authentication data, the card alias vault sub-module 168 may provide the merchant with an alias account number. For example, the card alias vault sub-module 168 may be adapted to generate a single use primary account number (PAN). Suitably, the card alias vault sub-module 168 maintains a record of the relationship between the alias account number and the transaction and/or authentication data in a database or memory, such as the database 172. In that regard, the alias account number is suitably correlated with a real account number. The merchant then uses this alias account number in a credit authorization message. Suitably, the merchant generates the credit authorization message using the alias account number and submits the credit authorization message to its Internet acquiring platform, optionally via a payment gateway. Based on the alias account number, the Internet acquiring platform routes the transaction to the message mapping engine sub-module 170. For example, the transaction is routed to the UMP 110 using a BIN number (unique to the UMP 110) of the alias account number. As another example, the Internet acquiring platform can request the UMP 110 to identify the transaction as a debit transaction.

Upon receiving the credit authorization message, the message mapping engine sub-module 170 converts the credit authorization message to a debit authorization message for submission to the debit acquiring platform. The debit authorization message suitably includes the payment type for the transaction. To convert the credit authorization message, the message mapping engine sub-module 170 merges and/or replaces data contained in the credit authorization message with the authentication data captured and delivered by the credentialing application launcher sub-module 166 to create the debit authorization message. In certain embodiments, the message mapping engine sub-module 170 also merges and/or replaces data contained in the credit authorization message with the routing information determined by the credentialing application launcher sub-module 166. The debit authorization messages are suitably tailored to the corresponding debit networks through which the debit authorization messages are to be routed. In certain embodiments, a rules engine may be employed to facilitate this tailoring. In that regard, debit network specific rules for converting credit authorization messages to debit authorization messages may be stored in a database or memory, such as the database 172. Furthermore, the message mapping engine sub-module 170 may accommodate e-commerce transaction types, such as delayed and recurring payments, that are not supported by the debit networks.

After generating the debit authorization message, it is sent to the debit acquiring platform to continue the transaction processing. The debit acquiring platform, in turn, sends the debit authorization message to the appropriate payment brand network for approval and posting by the appropriate issuer of the payment instrument. A debit authorization response message, such as a debit card 0210 message, is then returned back to the message mapping engine sub-module 170 by way of the debit acquiring platform. The message mapping engine sub-module 170 converts the debit authorization response message to a credit authorization response message, such as a credit card 0110 response message. As above, a rules engine employing debit network specific rules may be employed. While converting the debit authorization response message, debit specific information is removed and stored in a database or memory, such as the database 172, until the merchant's end of day period is complete. The message mapping engine sub-module 170 then sends the credit authorization response message to the Internet acquiring platform, which, in turn, returns it to the merchant.

Subsequent to receiving the credit authorization response message, typically at the end of each business day, the merchant undergoes a batch settlement process to capture funds for credit card based transactions. During settlement, settlement messages are sent in bulk for authorized transactions, including debit transactions, from the merchant to the Internet acquiring platform. The Internet acquiring platform groups the transactions according to recipient and sends settlement messages for the transactions (e.g., credit card transactions) to the corresponding recipient. For credit card based transactions the recipient is typically a corresponding payment brand network, and for debit card based transactions, the recipient is typically the third party 108 (more particularly the UMP 110).

The UMP 110, upon receiving settlement messages for pay as you go debit transactions, discards the settlement messages or saves them in a database or memory, such as the database 172. No other action is required for these settlement messages because funds are captured during authorization. Further, the UMP 110, upon receiving settlement messages for other debit transactions, employs the message mapping engine 170 to convert the settlement messages to the appropriate format for corresponding debit networks. As above, the conversion is suitably performed using a rules engine and debit network specific rules.

In addition to the foregoing settlement messages, reconciliation messages for debit transactions may be sent from the payment brand networks to the debit acquiring platform, and automated clearing house (ACH) settlement messages may be sent by the payment brand networks 138 to the issuers 134 and the debit acquiring platform to effect settlement of the transactions.

Based on the settlement messages sent to the Internet acquiring platform and the reconciliation messages sent to the debit acquiring platform, reconciliation is performed by the one or more payment processors providing the Internet acquiring platform and the debit acquiring platform. The Internet acquiring platform and debit acquiring platform for a debit transaction will each have half of the reporting necessary to reconcile the settlement related to the debit transactions. Notably, whereas the foregoing settlement and reconciliation processes, other than removing debit transactions, are common place in e-commerce systems, the present reconciliation is new to the present disclosure.

Although not necessary, in certain embodiments the converter module 164 further includes a fraud data storage sub-module 174. During the processing of transactions, the message mapping engine sub-module 170 collects data pertaining to the transactions and stores it in the fraud data storage sub-module 174. This data may include transaction information that cannot be passed in the messages moving through the message mapping engine sub-module 170. Advantageously, the data collected in the fraud data storage sub-module 174 may be used for fraud analytics. Further, although the discussion heretofore focuses on the authorization and capture of funds, in certain embodiments, charge backs can similarly be handled according to the foregoing discussion. In that regard, the Internet acquiring platform supplies the alias account number used for the transaction in the merchant and Internet acquiring platform records. The chargeback may come through with the real card account number.

One or more servers 176 connected to the communications network 112 suitably embody the third party 108. Each of the servers 176 includes one or more of a communications unit 178, at least one memory 180, a processor 182, and the like. The communications units 178 allow the servers 176 to interact with other components connected to the communications network 112. The memory 180 generally includes computer executable instructions for performing the above-noted functions associated with the third party 108. The processors 182 execute the computer executable instructions on the memory 180. Further, the servers 176 include the UMP 110 and the converter 164. Suitably, the UMP 110 and the converter 164 are embodied by computer executable instructions stored on computer readable mediums, where these computer executable instructions are executed by the processors 182. In some embodiments, the computer readable mediums may be the memory 180.

Figure 4:
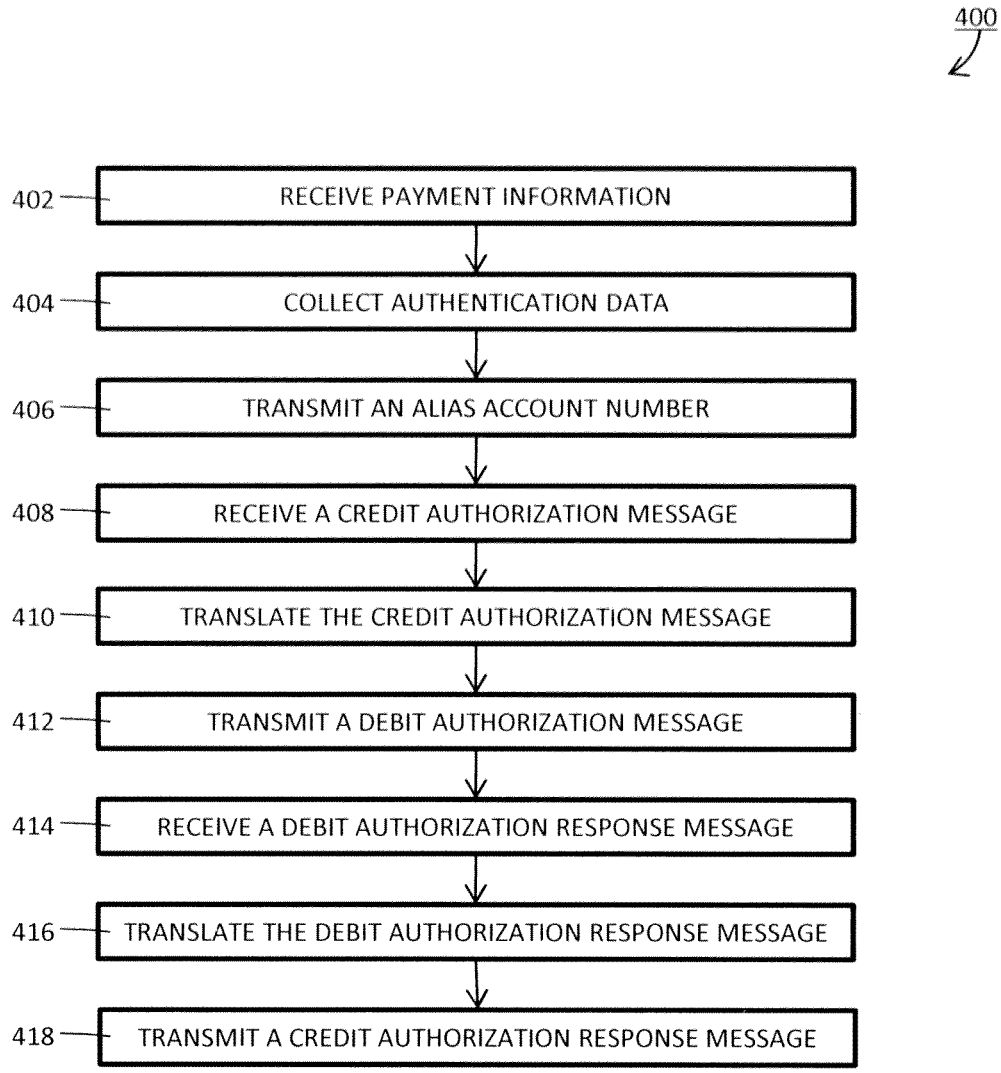

With reference to FIG. 4, a block diagram of a method 400 of processing debit card transaction between a merchant and a consumer is provided. Suitably, the method 400 is performed by the by the converter 164 of the UMP 110. Further, it is to be appreciated that the substance of the method 400 was described above in connection with the converter 164. That is to say, the Actions hereinafter described are to be understood as paralleling like Actions discussed above.

To begin, payment information for the consumer is received 402, typically via the communications network 112. Suitably, the payment information identifies a debit card, such as a PIN debit card, via, for example, a card number and an expiration date. As noted above, the collected payment information is based upon the payment type received from the consumer via the merchant. Thereafter, authentication data for the debit card is collected 404 from the consumer. Typically, the authentication is indicative of a PIN number, but other data appropriate for authentication is contemplated. As discussed above, authentication data is suitably collected using a credentialing application approved by one of the issuers 134. Further, a unique alias account number for the transaction is generated and transmitted 406 to the merchant. The alias account number is, for example, a PAN or the like.

The merchant typically uses the alias account number to generate a credit authorization request, which is submitted to the merchant's payment processor and routed back to the converter 164. In that regard, a credit authorization message including the alias account number from the merchant is received 408. The credit authorization message is then translated 410 to a debit authorization message using the authentication data. In certain embodiments, this entails merging the credit authorization message with the authentication data and/or employing a rules engine to perform the translation, where the rules engine uses debit network specific rules. The debit authorization message is transmitted 412 to the payment processor of the merchant. For pay as you go transactions this leads to the simultaneous authorization and capture of funds from the issuing bank.

Responsive to the debit authorization message, a debit authorization response message is received 414 from the payment processor. This message is translated 416 to a credit authorization response message, which is transmitted 418 to the merchant. In certain embodiments, a rules engine is employed to perform the translation, where the rules engine uses debit network specific rules. The merchant then employs the end of day settlement process typical of credit card transactions. During settlement, the pay as you go debit transactions are removed from the settlement process since settlement occurs during authorization for debit transactions. For remaining debit transactions, settlement messages specific to corresponding debit networks are generated and sent to the corresponding debit networks.

It is to be appreciated that suitably, the methods and systems described herein are embodied by a computer, or other digital processing device including a digital processor, such as a microprocessor, microcontroller, graphic processing unit (GPU), etc. and storage. In other embodiments, the systems and methods may be embodied by a server including a digital processor and including or having access to digital data storage, such server being suitably accessed via the Internet or a local area network, or by a personal data assistant (PDA) including a digital processor and digital data storage, or so forth. The computer or other digital processing device suitably includes or is operatively connected with one or more user input devices, such as a keyboard, for receiving user input, and further includes, or is operatively connected with, one or more display devices. In other embodiments, the input for controlling the methods and systems is received from another program running previously to or concurrently with the methods and systems on the computer, or from a network connection, or so forth. Similarly, in other embodiments the output may serve as input to another program running subsequent to or concurrently with methods and systems on the computer, or may be transmitted via a network connection, or so forth.

In some embodiments, the exemplary methods, discussed above, the system employing the same, and so forth, of the present application are embodied by a storage medium storing instructions executable (for example, by a digital processor) to implement the exemplary methods and/or systems. The storage medium may include, for example: a magnetic disk or other magnetic storage medium; an optical disk or other optical storage medium; a random access memory (RAM), read-only memory (ROM), or other electronic memory device or chip or set of operatively interconnected chips; an Internet server from which the stored instructions may be retrieved via the Internet or a local area network; or so forth.

It is to further be appreciated that in connection with the particular exemplary embodiments presented herein certain structural and/or functional features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

Even more, it is to be appreciated that, as used herein, a memory includes one or more of a non-transient computer readable medium; a magnetic disk or other magnetic storage medium; an optical disk or other optical storage medium; a random access memory (RAM), read-only memory (ROM), or other electronic memory device or chip or set of operatively interconnected chips; an Internet server from which the stored instructions may be retrieved via the Internet or a local area network; or so forth. Further, as used herein, a processor includes one or more of a microprocessor, a microcontroller, a graphic processing unit (GPU), an application-specific integrated circuit (ASIC), a field-programmable gate array (FPGA), and the like; a communications network includes one or more of the Internet, a local area network, a wide area network, a wireless network, a wired network, a cellular network, a data bus, such as USB and I2C, and the like; a user input device includes one or more of a mouse, a keyboard, a touch screen display, one or more buttons, one or more switches, one or more toggles, and the like; a database includes at least one memory; and a display includes one or more of a LCD display, an LED display, a plasma display, a projection display, a touch screen display, and the like.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof. That is to say, it will be appreciated that various of the above-disclosed and other features and functions, or alternatives thereof, may be desirably combined into many other different systems or applications, and also that various presently unforeseen or unanticipated alternatives, modifications, variations or improvements therein may be subsequently made by those skilled in the art which are similarly intended to be encompassed by the following claims.

The invention claimed is:

1. A system for processing a debit transaction between a merchant server and a consumer computer, said system comprising:
   one or more processors of a third party programmed to:
   receive a card number identifying a debit card of the consumer for completion of the debit transaction from the consumer computer;
   select on of a plurality of different credentialing applications based on the received card number, said credentialing applications operative to collect authentication data from the consumer computer;
   collect authentication data for the debit card from the consumer computer using the selected credentialing application;
   subsequent to collecting the authentication data: 1) generate an alias account number correlated with the card number; and 2) store the alias account number, the card number identifying the debit card, and the authentication data in a storage;
   transmit the alias account number to the merchant server, wherein the alias account number is unique to the debit transaction relative to other debit transaction;
   subsequent to transmitting the alias account number to the merchant server, receive from the merchant server a credit authorization request to capture funds from the alias account number, the credit authorization request received from the merchant server in a credit authorization message, wherein the credit authorization message includes the alias account number;
   retrieve the authentication data from the storage using the alias account number in the credit authorization message;
   translate the received credit authorization message to a debit authorization request message using the authentication data, wherein the debit authorization request message includes the authentication data; and
   request debit authorization to capture funds from the card number by transmitting the debit authorization request message to a payment processor,
   wherein the debit card comprises a PIN debit card and said collected authentication data includes a personal identification number (PIN) for the debit card.

2. The system according to claim 1, wherein the one or more processors are further programmed to:
   receive a debit authorization response message from the payment processor;
   translate the debit authorization response message to a credit authorization response message; and
   transmit the credit authorization response message to the merchant server.

3. The system according to claim 1, wherein the one or more processors are further programmed to:
   translate the credit authorization message to the debit authorization request message using a rules engine applying rules specific to a debit network corresponding to the debit transaction.

4. The system according to claim 1, wherein the one or more processors are programmed to at least one of:
   receive the card number over a communications network;
   collect the authentication data over the communications network;
   provide the alias account number over the communications network;
   receive the credit authorization message over the communications network; and
   submit the debit authorization request message over the communications network.

5. The system according to claim 1, wherein the selected credentialing application is operative to collect authentication data including a personal identification number (PIN) for the debit card.

6. The system according to claim 1, wherein the credit authorization message is formatted according to a format of an Internet acquiring platform, wherein the debit authorization message is formatted according to a format of a debit acquiring platform of the payment processor and wherein the Internet acquiring platform processes transactions initiated at electronic commerce merchants and the debit acquiring platform processes transactions initiated at physical world merchants.

7. The system according to claim 1, wherein the credit authorization message and the debit authorization message are formatted according to International Organization for Standardization (ISO) 8583, the credit authorization message being a 0100 series message and the debit authorization message being a 0200 series message.

8. The system according to claim 1, wherein the card number is received subsequent to initiation of the debit transaction.

9. A method for processing a debit transaction between a merchant server and a consumer computer, said method comprising:
   receiving, by one or more processors of a third party, a card number identifying a debit card of the consumer for completion of the debit transaction from the consumer device;
   selecting, by the one or more processors of the third party, one of a plurality of different credentialing applications based on the received card number, said credentialing applications operative to collect authentication data from the consumer device;
   collecting, by the one or more processors of the third party, authentication data for the debit card from the consumer device using the selected credentialing application;
   subsequent to collecting the authentication data: 1) generating, by the one or more processors of the third party, an alias account number correlated with the card number; and 2) storing, by the one or more processors of the third party, the alias account number, the card number identifying the debit card, and the authentication data in a storage;
   transmitting, by the one or more processors of the third party, the alias account number to the merchant server, wherein the alias account number is unique to the debit transaction relative to other debit transactions;
   subsequent to transmitting the alias account number to the merchant server, receiving, by the one or more processors of the third party, a credit authorization request to capture funds from the alias account number, the credit authorization request received from the merchant server in a credit authorization message, wherein the credit authorization message includes the alias account number;
   retrieve, by the one or more processors of the third party, the authentication data from the storage using the alias account number in the credit authorization message;
   translating, by the one or more processors of the third party, the received credit authorization message to a debit authorization request message using the authentication data, wherein the debit authorization request message includes the authentication data; and
   requesting, by the one or more processors of the third party, debit authorization to capture funds from the card number by transmitting the debit authorization request message to a payment processor,
   wherein the debit card comprises a PIN debit card and said collected authentication data includes a personal identification number (PIN) for the debit card.

10. The method according to claim 9, further including:
    receiving a debit authorization response message from the payment processor;
    translating the debit authorization response message to a credit authorization response message; and
    transmitting the credit authorization response message to the merchant server.

11. The method according to claim 10, wherein the translating the debit authorization response message to the credit authorization response message includes: removing debit specific information.

12. The method according to claim 9, further including:
    determining data from the credit authorization message that cannot be added to the debit authorization request message when translating the credit authorization message to the debit authorization request message using the authentication data; and
    storing the determined data in a database.

13. The method according to claim 9, wherein the alias account number is a primary account number (PAN).

14. The method according to claim 9, wherein the translating the credit authorization message to the debit authorization request message using the authentication data includes:
    merging data of the credit authorization message and the authentication data into the debit authorization request message.

15. The method according to claim 9, wherein selecting the one of the plurality of different credentialing applications includes:
    looking up a record in a bank identification number (BIN) table using the card number.

16. The method according to claim 9, wherein the selected credentialing application is operative to collect authentication data including a PIN for the debit card.

17. The method according to claim 1, wherein the card number is received subsequent to initiation of the debit transaction.

18. A non-transitory computer medium carrying software when executed by one or more processors of a third party causes the one or more processors to:
    subsequent to initiation of a debit transaction between a merchant server and a consumer computer:
        receive a card number identifying a debit card of the consumer for completion of the debit transaction from the consumer computer;
        select on of a plurality of different credentialing applications based on the received card number, said credentialing applications operative to collect authentication data from the consumer computer;
        collect the authentication data for the debit card from the consumer computer using the selected credentialing application;
        subsequent to collecting the authentication data: 1) generate an alias account number correlated with the card number; and 2) store the alias account number, the card number identifying a debit card, and the authentication data in a storage;
        transmit the alias account number to the merchant server, wherein the alias account number unique to the debit transaction relative to other debit transactions;
        subsequent to transmitting the alias account number to the merchant server, receive from the merchant server a credit authorization request to capture funds from the alias account number, the credit authorization request received in a credit authorization message, wherein the credit authorization message includes the alias account number;
        retrieve the authentication data from the storage using the alias account number in the credit authorization message;
        translate the received credit authorization message to a debit authorization request message using the authentication data, wherein the debit authorization request message includes the authentication data; and request debit authorization to capture funds from the card number by transmitting the debit authorization request message to a payment processor,
wherein the debit card comprises a PIN debit card and said collected authentication data includes a personal identification number (PIN) for the debit card.

* * * * *